United States Patent [19]

Schurr et al.

[11] 4,370,810
[45] Feb. 1, 1983

[54] PORTABLE MOTOR CHAIN SAW

[75] Inventors: Volker Schurr, Schwieberdingen; Hans Nickel, Burgstetten; Klaus Höppner, Marbach; Gisbert Köhler, Fellbach; Hermann Weiss, Erdmannhausen; Dieter Wieland, Neckarrems, all of Fed. Rep. of Germany

[73] Assignee: Andreas Stihl, Waiblingen, Fed. Rep. of Germany

[21] Appl. No.: 154,533

[22] Filed: May 29, 1980

[30] Foreign Application Priority Data

Jun. 2, 1979 [DE] Fed. Rep. of Germany ....... 2922573

[51] Int. Cl.³ .............................................. B27B 17/02
[52] U.S. Cl. .................................................... 30/382
[58] Field of Search .................................. 30/381, 382

[56] References Cited

U.S. PATENT DOCUMENTS

| 4,057,900 | 11/1977 | Nagy | 30/382 |
|---|---|---|---|
| 4,059,895 | 11/1977 | Hirschkoff | 30/382 |
| 4,091,896 | 5/1978 | Wieland | 30/382 |
| 4,197,640 | 4/1980 | Murray | 30/382 |

Primary Examiner—Jimmy C. Peters
Attorney, Agent, or Firm—Becker & Becker, Inc.

[57] ABSTRACT

A portable motor chain saw with a braking device, for stopping the saw chain during recoil, and with a release, for the braking device, which in the release position is operatively connected with a locking mechanism of the braking device. The release is an inertial mass which is freely movable along an acceleration path, with the kinetic energy of the inertial mass in the release position being greater than the resistance force of the locking mechanism. The release is held in the ready position by at least one holder, preferably a spring which extends between the saw housing and the release.

19 Claims, 15 Drawing Figures

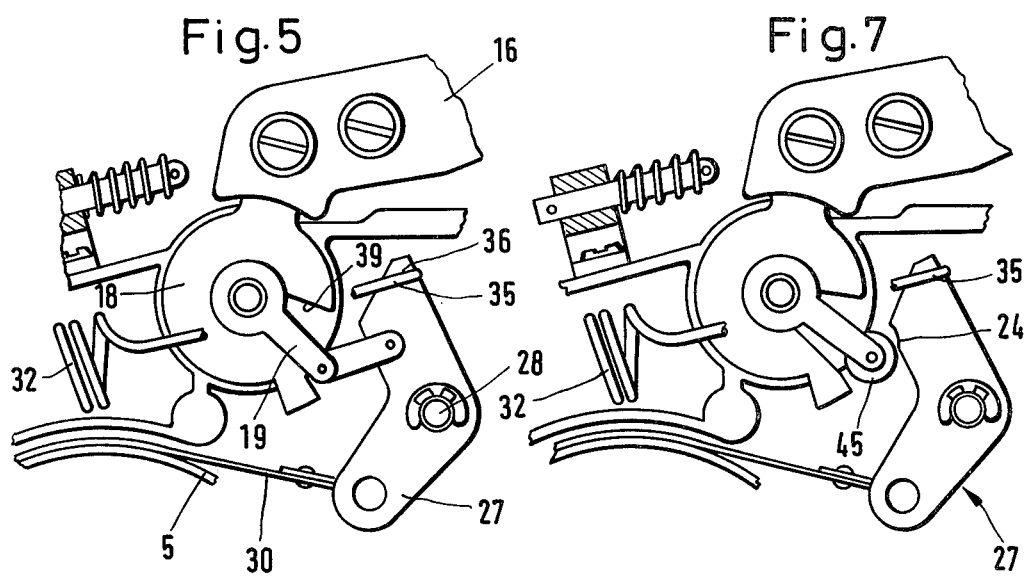

PORTABLE MOTOR CHAIN SAW

The present invention relates to a portable motor chain saw having a braking device for stopping the saw chain during recoil, and a release, for the braking device, which in the release position is operatively connected with a locking mechanism of the braking device.

The release or tripping device of a known motor chain saw of this type (German Offenlegungsschrift No. 26 02 247) is a finger guard which in the ready position engages the locking device by means of a bearing part. This guard is actuated with its bearing part by having the hand engage the release during recoil of the motor chain saw. The locking mechanism is released by the force of the bearing part effective thereon, so that the braking device can become effective. With this motor chain saw, the release of the braking device is accordingly dependent upon how the operator holds the handle. If the handle is held very securely, or if the hand slides sideways during a recoil, then, on the basis of these individual factors, the braking device can be released either too early or too late.

It is an object of the present invention to embody a motor chain saw of this type in such a way that without any noteworthy increase in weight of the release or triggering device, the braking device is automatically actuated during recoil of the saw chain.

This object, and other objects and advantages of the present invention, will appear more clearly from the following specification in connection with the accompanying drawings, in which:

FIG. 5 shows the braking device according to FIG. 4 in the braking position;

FIG. 7 shows the braking device of FIG. 6 in an illustration corresponding to that of FIG. 5.

Figure 1:
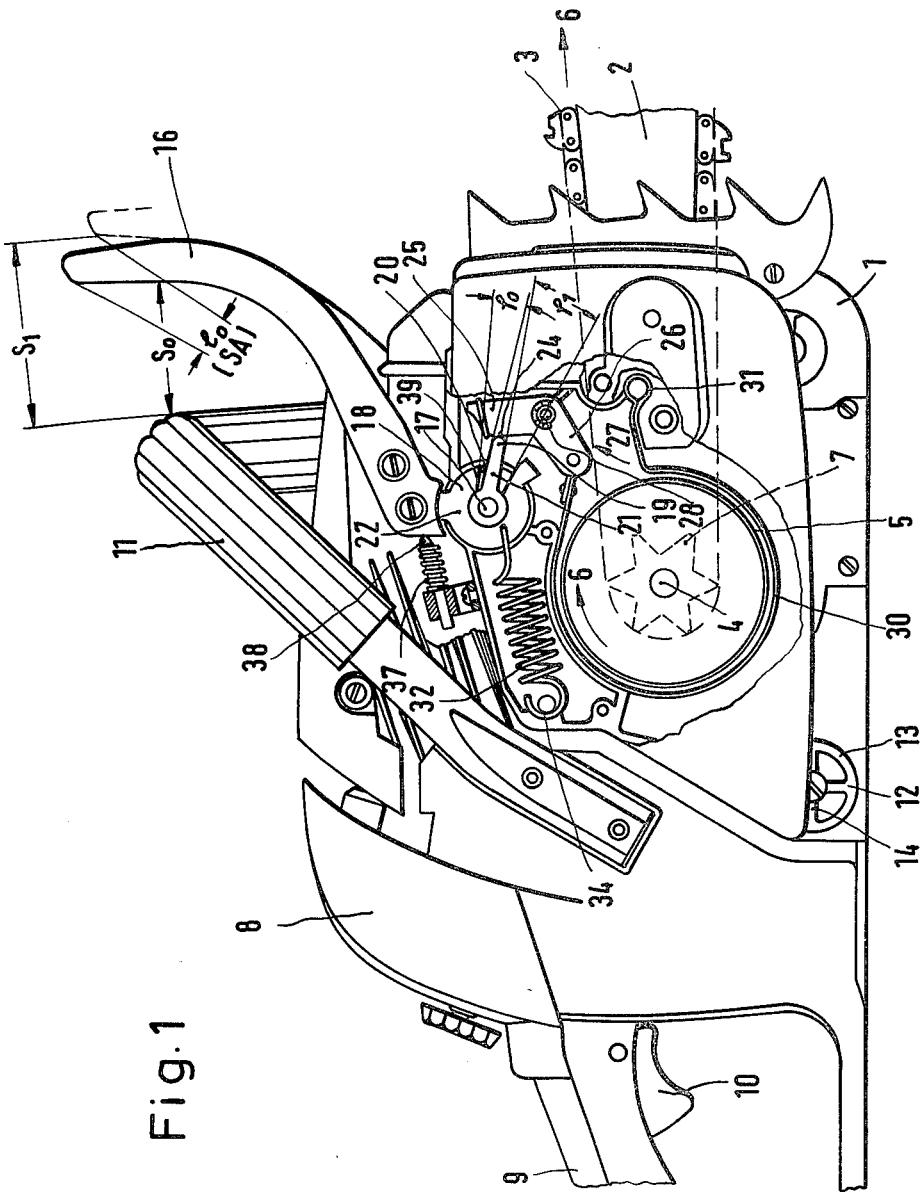
FIG. 1 is a partially sectioned side view of a portable motor chain saw, with the braking device in ready position.

The motor chain saw of the present invention is characterized primarily in that the release or triggering device is an inertial mass which is freely movable along an acceleration path, with the kinetic energy of the inertial mass in the release position being greater than the resistance force of the locking mechanism.

The release or triggering device, as a consequence of its dead weight, can be so strongly accelerated along the acceleration path during recoil of the chain saw that the kinetic energy attained thereby is sufficient to release the locking mechanism during cooperation with the release. The braking device accordingly starts automatically, without the operator having to actuate the release or trigger device. Consequently, the braking device essentially operates free of any delay, and independent of individual influences and occurrences. Most of all, the resistance force of the locking mechanism can be kept within narrowly defined limits, as a result of which an especially high safety and independence of the operation of the saw is assured. Simultaneously, the advantage results that by the free movability and the acceleration path, without increasing the weight of the finger guard, there can be attained so high a kinetic energy that this is sufficient to automatically overcome the resistance force of the locking mechanism. This is true even if a release or trigger device is provided in addition to the finger guard, because due to the acceleration path, a dead weight which only insignificantly increases the weight of the motor chain saw is already sufficient to release the locking mechanism during recoil of the saw.

According to further advantageous features of the present invention, the release, in its ready position, may have an angular spacing, from the locking mechanism, corresponding to the acceleration path and amounting to at least approximately $1\frac{1}{2}°$, preferably approximately $4°$. The release may be held in its ready position by at least one holder, preferably a spring, which preferably extends between the saw housing and the release. The release, preferably a bearing part of a finger guard, in the ready position may have rotary play on both sides relative to the locking mechanism, preferably a locking arm which is connected with an angular lever of the braking device. The spring may be embodied as a spring clip, one end of which projects into a bore of the bearing part, and the other end of which projects into a bore of the locking arm; the legs extend approximately in a hairpin configuration, with the free ends thereof, in the ready position, engaging a housing part or another part, and in the position when not ready, for instance in the braking position, being respectively supported or engaged, with one of its legs, against the other part, which is associated with the release, preferably with the bearing part thereof, and is located between the arcuate leg region and the housing part.

A locking recess may be provided for the drag lever or arm on the narrow side of that arm of the angular lever which faces the bearing part 18 of the finger guard and is connected with a spring and with the locking arm. The locking arm may have a roller provided at its free end, the roller being engageable in the locking recess, whereby preferably the outer diameter of the roller is at least twice as large as the radius of the locking recess. Alternatively, the locking arm may be pivotally connected with the angular lever by a connecting arm, which with the drag lever forms an elbow linkage that is held in a stable locking position by the spring; in this position, the locking arm and the connecting arm form an angle of approximately 180°, preferably between 160° and 179°.

One end of the spring clip may lie in a transverse bore of a sleeve or bushing arranged on the pivot bearing part, while the other end of the spring clip lies in a bore of the locking arm, with an adjustment member, such as a threaded pin, being associated with the bushing. The release may be located between the finger guard and the saw chain, and may cooperate with a locking mechanism embodied as an elbow linkage which is provided with a handle integral with a locking arm, whereby the elbow linkage, in the extended position, is limited by abutments. The elbow linkage has associated therewith an adjustment part, such as a threaded pin or the like which engages in the region of the pivot axis. The release may be adjustable relative to its bearing part, preferably by means of an adjusting means. The release, preferably the finger guard, may have an insert or plug or recess for an insert or plug of the bearing part, and the bottom of the recess may have a serrated or toothed portion which is capable of being brought into engagement with a tapered end of the plug or insert.

Figure 2:
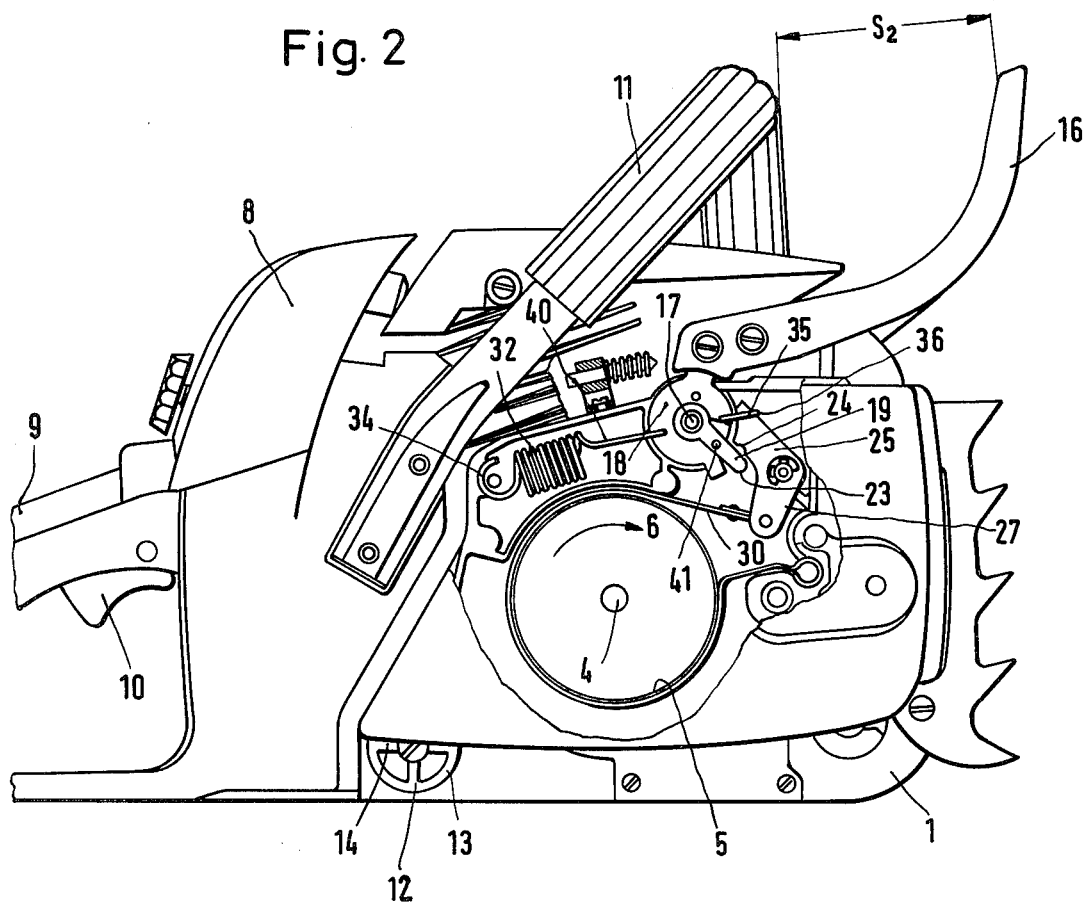
FIG. 2 is an illustration corresponding to that of FIG. 1, with the braking device in the braking position.
Figure 3:
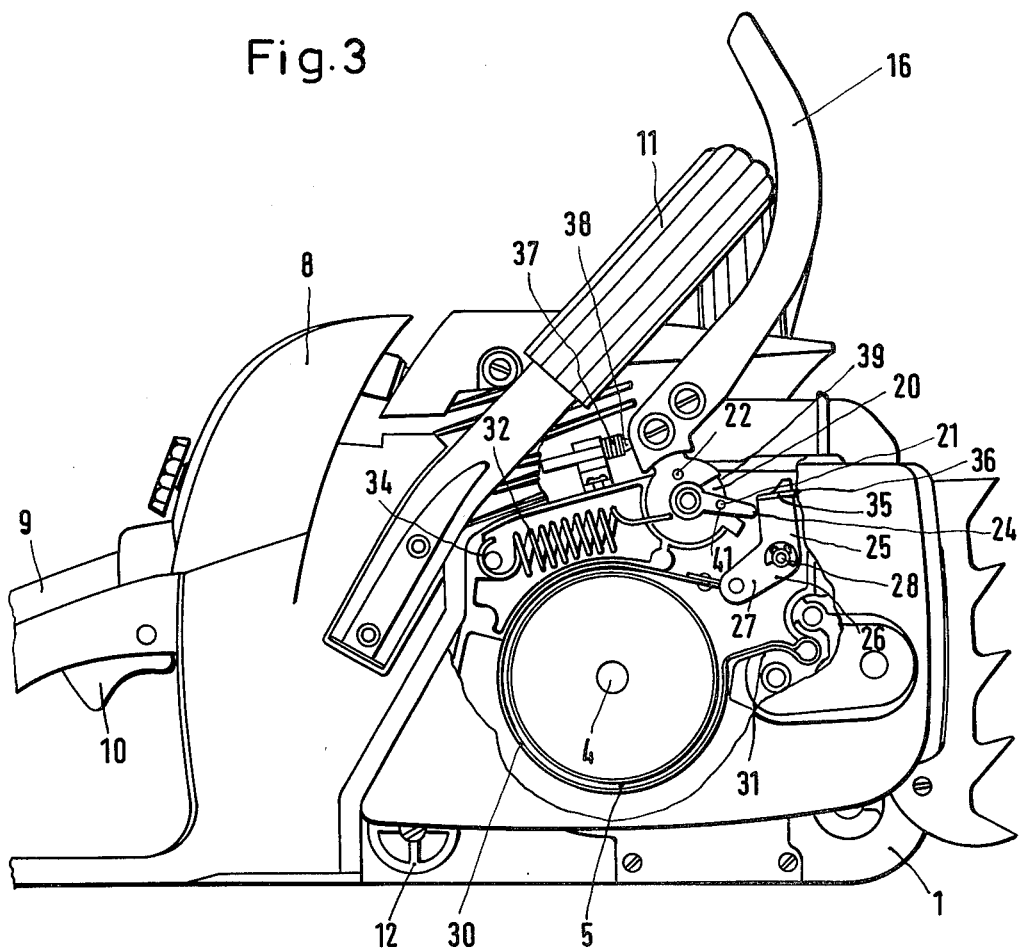
FIG. 3 is an illustration corresponding to that of FIG. 1, with which the braking device, after release by pivoting back a release mechanism embodied as a hand protective bracket or frame, is returned into its ready position.

Referring now to the drawings in detail, the portable motor chain saw illustrated in FIGS. 1 through 3 has a motor and chain housing 1 which serves as a supporting frame for a saw blade tongue 2 having an endless saw chain 3 circulating thereon, and for an internal combustion engine (not illustrated) serving as the drive motor for the saw chain. The turning axis 4 of the internal combustion machine is located at right angles to a cutting plane determined by the saw tongue 2. The coupling drum 5 of a centrifugal clutch is additionally rotatably journalled in the motor housing 1. This centrifugal clutch, by means of non-illustrated centrifugal weights which are positively connected with the crank shaft of the internal combustion machine, frictionally positively engages when the speed of the internal combustion machine is increased above the idling speed to the operating speed of, for example, more than 5,000 rotations per minute. In this coupled condition, the saw chain 3 is driven by the internal combustion machine, in the direction of rotation represented by arrow 6, by means of a drive wheel 7 secured to the outside of the clutch or coupling drum 5.

In order to be able to safely guide the motor chain saw during the sawing procedure, a rigid grip or handle housing 8 is provided, which in turn is provided with a rear grip or handle 9, illustrated only partially, with control elements 10 for the internal combustion machine, as well as with a front grip or handle 11 securely screwed or secured thereto. This front handle extends, along its middle section, transverse to the cutting plane of the saw chain 3, and is arranged above the center of gravity of the saw (not illustrated in the drawing) in the vertical cutting position of the saw represented in FIGS. 1 through 3.

So that the longitudinal oscillations arising during the saw work and forming in the running direction of the saw chain 3 cannot be transferred to the handles 9 and 11, rubber-elastic damping elements are provided at three connection points, located as far apart from each other as possible between the motor housing 1 and the grip or handle housing 8, with one of these damping members being indicated at 12. These damping members, with the tubular mantle 13 thereof, are rigidly clamped or secured in the motor housing 1 and support the handle housing 8 by means of radial crosspieces 14 which absorb in a damping manner the vibrations which develop in a longitudinal direction; nevertheless, these damping members assure a substantially rigid mounting of the handle housing 8 on the motor housing 1 at the bearing locations of the handle housing 8 in a direction at right angles to the cutting plane in such a manner that the motor chain saw has a safe side guidance.

When the saw chain 3, for example during removal of branches, binds or becomes jammed in wood, a recoil or kickback (backlash) can be directed against the operator, and is accompanied by considerable danger of accident or injury. For stopping the driving of the chain saw 3 in this situation as quickly as possible, or at least to brake to a rate which is not dangerous, the motor chain saw has a braking device which becomes effective or operative when such centrifugal movements exceed a predetermined level.

A release or triggering mechanism of this braking device, embodied as a hand or finger guard 16, is arranged at a slight distance from the handle 11, and more particularly, between the handle 11 and the saw chain 3. The guard 16 is pivotally journalled, by a bearing or support part 18 screwed thereto, about an axis located on the motor housing 1, and formed by a pin 17 extending parallel to the motor-axis of rotation 4. The disc-like bearing part 18 has a segment-shaped recess with which, in the ready position, it surrounds a locking arm 19 of a locking mechanism with angular spacing of $\rho 0$ and $\rho 1$ on both sides. The locking arm 19 is pivotal around the same pin 17 as is the bearing part 18. The guard 16, in the ready position, has a spacing $S_0$ of approximately 40 mm from the handle 11; and the locking arm 19, with a curved end face 23 (FIGS. 2 and 3), lies in a correspondingly concave latching or locking recess 24 of a two-arm angular lever 27 of the locking mechanism. The locking or arresting recess 24 is arranged in the narrow, longitudinal side of the upper arm 25 of the angle lever 27 facing the locking arm 19. The lever 27 is pivotally journalled upon a pin 28 rigidly mounted to the housing. The free end of the lower arm 26 of the lever 27 is connected with the free end of a flat brake band 30 of the braking device of which the other end of the band 30 is interchangeably fastened to the motor housing with a loop 31 (FIGS. 1 and 3).

The brake band 30 surrounds the coupling drum 5 over approximately 370°, so that the coupling drum, during stopping of the saw chain, serves as a brake drum for the braking device. In the ready position of the braking device (FIG. 1), the brake band 30 is slightly spaced from the brake drum mantle (the brake drum consequently can rotate freely), while the brake band in the braking position engages the brake drum. In this connection, the locking mechanism, in particular the locking arm 19 and the angular lever 27, is unlocked or released, and the angular lever 27 is rotated counterclockwise by a coil spring 32. The end 34 of the coil spring 32 is connected so as to be pull resistant with respect to the motor housing 1. The other end 35 of the spring 32 is hung or suspended in a semicircular groove 36 (FIGS. 2 and 3), which is located on that side of the upper arm 25 facing away from the locking arm 19. In the braking and ready positions of the braking device, a straight tensioned segment 40 of the coil spring 32 extends closely below the turning axis of the bearing part 18, so that the angular lever 27 is subjected to especially advantageous force conditions or relationships.

The guard 16, in the ready position, engages an abutment 38, which is under the force of a compression spring 37, whereby the spacing $S_0$ thereof with respect to the handle 11 is fixed. From this ready position, the braking device attains the braking position as described in the following statements.

During recoil of the motor chain saw, the guard 16, as a consequence of its mass moment of inertia, is rotated clockwise relative to the motor and saw housing 1 by the angular spacing $\rho_0$ up to engagement (via bearing part 18) against the locking arm 19. In so doing, the spacing of the handle 11 increases to approximately 60 mm, as represented by $S_1$ in FIG. 1. The angular spacing $\rho_0$ under these circumstances is such that the kinetic energy, which the guard 16 receives during its acceleration along the acceleration path $\rho_0$, and which is converted into impact energy during engagement of the pertaining abutment edge 39 against the locking arm 19, is sufficient to press the locking arm 19 out of the locking or arresting recess 34 of the angular lever 27 (FIG. 2). The guard 16 then has the spacing $S_2$ of approximately 100 mm from the handle 11. Consequently, the path is free for the angular lever 27, which is under tension, so that this lever 27 can rotate counterclockwise, as a result of which the brake band 30 lies tightly around the brake drum.

To again lift the brake band 30 from the brake drum after stopping the saw chain 3, the guard 16 must be pivoted or swung back counterclockwise until it engages the handle 11 (FIG. 3). In this connection, the locking arm 19 is taken along counterclockwise by the lower abutment edge 41 of the bearing part 18, whereby the latter presses the upper arm 25 of the angular lever 27 so far toward the right until it engages or catches in the arresting recess 24; the coil spring 32 is again tensioned under these circumstances. In this position, the guard 16 presses against the abutment bolt 38, which is under the pressure of the coil spring 37, so that the guard 16 is automatically pivoted into the ready position when it is released.

If necessary, the guard 16 also can be released manually if the operator presses it away from the handle 11 by an angular spacing greater than $\rho_0$, so that the locking arm 19 is pressed out of the arresting recess 24 of the angular lever 27. The angular lever 27 is then swung or pivoted counterclockwise under the force of the coil spring 32 as described above, whereby the brake band is pressed against the brake drum 5, and consequently the saw chain is stopped.

Additional embodiments of an inventive motor saw chain are illustrated in FIGS. 4 through 11. These embodiments vary by way of the different embodiment of the arresting or latching mechanisms thereof. These embodiments, when compared with the first solution or embodiment, have the advantage that because of the lacking or missing arresting recess 24, the frictional influences are smaller, so that the resistance force of the locking or arresting can be at closer tolerances, and the automatic release occurs still faster and more accurately.

In the following paragraphs, the identical structural parts, or parts which operate identically, are designated with the same reference numerals as were used in FIGS. 1 through 3.

Figure 4:
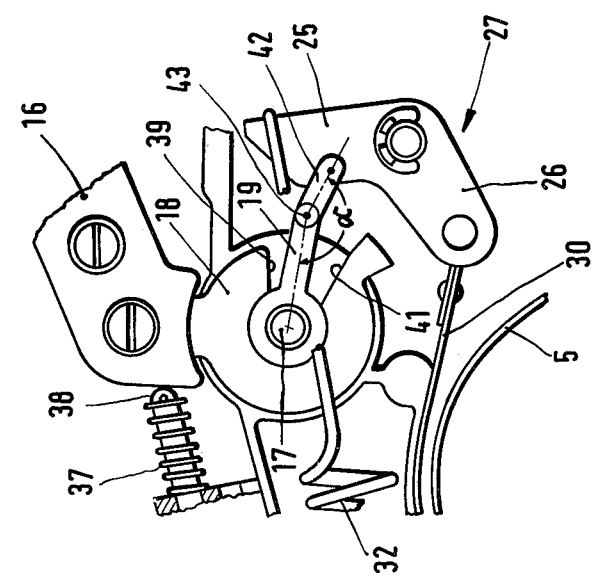
FIG. 4 is an enlarged illustration of a further embodiment of the braking device of the motor chain saw, in ready position, according to FIGS. 1 through 3.

With the embodiment according to FIGS. 4 and 5, a connecting arm 42 is linked to the free end of the locking arm 19, and the arms 19 and 42 together form an elbow or bent lever of the locking mechanism. The connecting arm 42 additionally is pivotally secured to the upper arm 25 of the angular lever 27. When the guard 16 of the braking device with this embodiment of the locking mechanism, is pivoted, corresponding to FIG. 3, against the handle 11 in the ready position of the braking device, the bearing part 18 during rotation takes the locking arm 19 along upwardly until it occupies an extended position relative to the connecting arm 42. Under these circumstances, the locking arm 19 and the connecting arm 42 form a downwardly open obtuse angle $\alpha$ of less than 180°, preferably an angle of 160°.

When, in the manner known with elbow levers, by way of non-illustrated abutments effective with respect to each other, there is prevented that the angle $\alpha$ be reduced and the elbow joint can break out upwardly, then the locking arm 19 and the angular lever 27 are securely held in the locking position by the coil spring 32.

When the guard 16 with the bearing part 18 is rotated clockwise for automatic release of the braking device, then the upper abutment edge 39 of the bearing part 18 engages the locking arm 19 and presses it downwardly against the holding force effective in the extended position of the angular lever, whereby the coil spring 32 is relieved and the angular lever 27 pivots into the braking position (FIG. 5).

Figure 6:
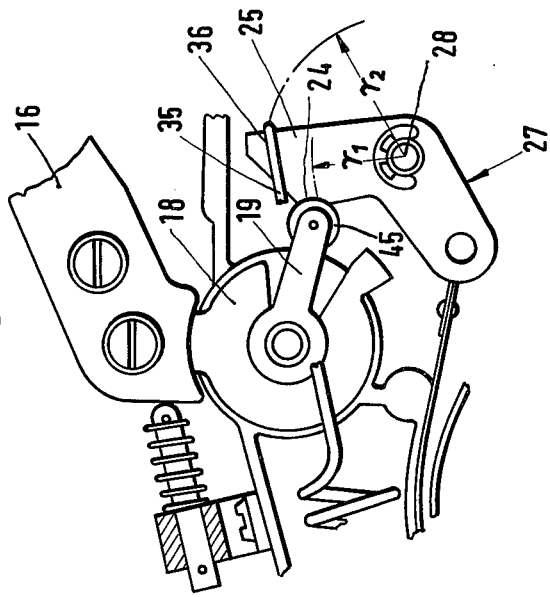
FIG. 6 illustrates a third embodiment of a braking device in a view corresponding to that of FIG. 4.

With the embodiment according to FIGS. 6 and 7, a supporting roller 45 is rotatably journalled at the free end of the locking arm 19; the arresting arm 19, with the supporting roller 45, in the ready position of the braking device, lies in the arresting recess 24 of the upper arm 25. The outer diameter of the supporting roller 45 is slightly greater than twice the radius of the arresting recess 24, as a result of which an especially reliable arresting connection is assured. Additionally, as a consequence thereof, the necessary mass moment of inertia can be very accurately adjusted, which is still further improved thereby that the radial spacing $\gamma_1$ of the arresting recess 24 from the pivot axis 28 of the angular lever 7 is clearly less than the spacing $\gamma_2$ of the semicircular groove 36 (provided to receive the end 35 of the coil spring 32) from the pivot or turning axis 28 (FIG. 6).

Figure 8:
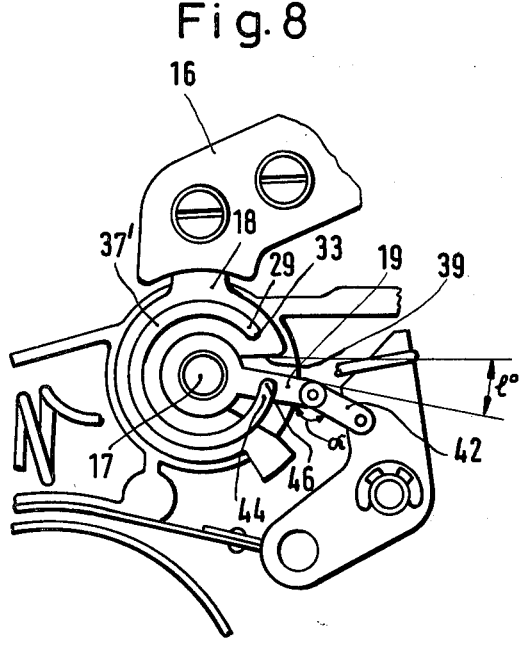
FIGS. 8 through 13 respectively show a further embodiment of the braking device in illustrations corresponding to FIG. 4.
Figure 9:
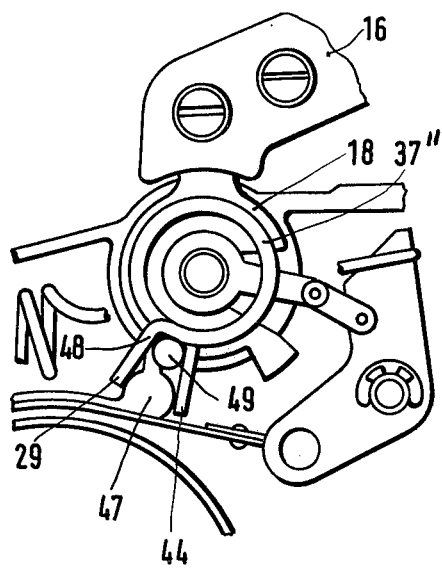
Figure 10:
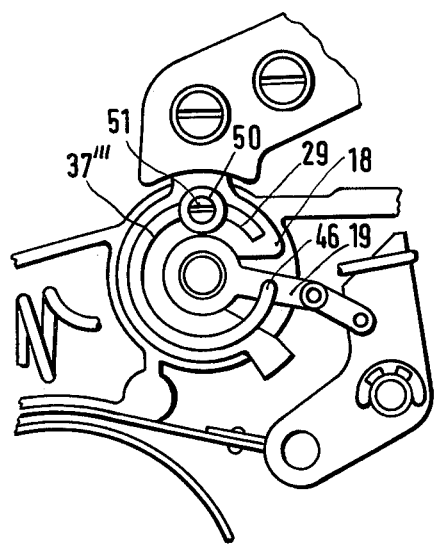

In order to also keep the guard 16 in the ready position when working, while encountering slight vibrations and the like, that is, to maintain the angular spacing $\rho_0$ from the locking arm 19, different resilient or spring-holding means are provided with the embodiments according to FIGS. 8 through 10 in place of the compression spring 37 and the abutment pin or bolt 38. With all embodiments, the defined ready position of the guard 16, however, is attained by a spring, which is designated with the same reference numeral as used for the compression spring, but with primes added thereto. With this spring, the guard 16 is kept in an unstable or floating equilibrium position, namely the ready position. The spring force necessary for this purpose is dependent upon a minimum force and a maximum force, within the limits of which the resistance force of the locking or arresting mechanism must be maintained.

A simple, approximately C-shaped spring clip 37' is provided as the holding means in FIG. 8. One leg 29 of this spring clip 37' projects into a corresponding bore 33 of the bearing part 18, end the other leg 44 of the spring clip 37' projects into a bore 46 of the locking arm 19. The spring clip 37', in the ready position, lies in essence coaxial with respect to the pin 17 with which the locking arm and the bearing part are journalled on the housing. The bore 33 of the bearing part 18 is slightly spaced from the locking arm 19 above the abutment edge 39 of the bearing part 18. The necessary acceleration path $\rho_0$ of the guard 16 can be adjusted very accurately with the position of the bores 33 and 46 with respect to each other, and with the form of the spring.

During recoil of the saw chain and during acceleration of the guard 16 in the direction of the locking arm 19 or the elbow lever 19, 42, the spring legs 29 and 44 are pressed together, while the spring clip 37', during retraction of the guard 16, expands beyond the ready position. Upon release of the guard, the latter is moved automatically by the spring clip 37' into the ready position with the angular spacing $p_0$ relative to the elbow lever 19,42. This angular spacing, accordingly is independent of the angle $\alpha$ formed by the elbow lever 19, 42, so that the acceleration path necessary for releasing the braking device is also provided when this angle $\alpha$ changes for example as a consequence of external geometric influences.

With the spring 37" according to FIG. 9, the free ends of the legs 29 and 44 thereof, which have a hairpin-shaped configuration relative to each other, engage a pin or stud 47 fixed to the housing. In the region of the arcuate-shaped segment 48 of the leg ends, there is located a further stud or pin 49, which is fastened to the bearing part 18 of the guard 16. If now the guard 16, during recoil of the saw chain, is accelerated, the bolt or pin 49 moves clockwise against the leg 29 located in front of it, while the pin 47 fixed to the housing is supported against the second leg 44. If the guard 16 is moved in the opposite direction, then the inwardly located pin 49 engages the second leg 44, and the first leg 29 is supported on the pin 47 fixed to the housing. Also in this situation, the guard 16 automatically occupies its ready position upon release under the force of the spring 37".

FIG. 10 shows still another embodiment, which corresponds essentially to the embodiment according to FIG. 8, with the difference that the first leg end 29 of the spring 37''' does not project into a bore of the bearing part 18, but rather projects into a transverse bore of a sleeve or bushing 50 which is rigidly connected with the bearing part 18. In order to be able to satisfactorily adjust the bearing part 18 with respect to the locking arm 19, a threaded pin 51 is inserted in the sleeve or bushing 50; the first leg 29 is capable of being clamped or held by this threaded pin 51 with respect to the sleeve or bushing 50.

Figure 11:
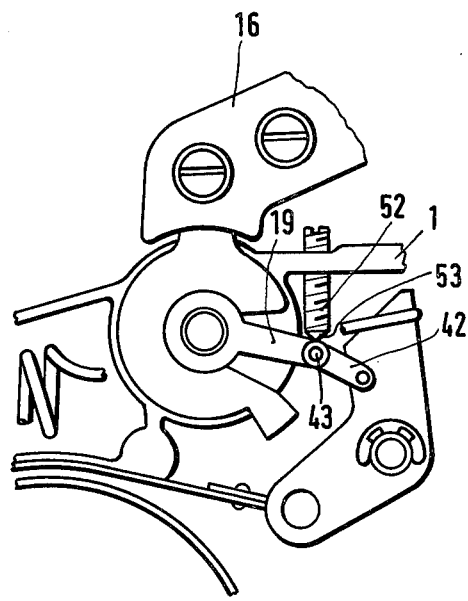

FIG. 11 shows an adjustment element 52 with which the angle $\alpha$ of the elbow lever 19, 42, and accordingly the resistance force of the locking means, can be changed. This adjustment element 52 is a screw mounted in the saw housing 1; in the ready position of the guard 16, the tapered end 53 of the screw 52 forms an upper abutment for the elbow lever 19, 42 in the region above the pivot axis 43 thereof. In this way, the press-through path of the elbow lever 19, 42 can be limited with the screw. The resistance force of the locking mechanism is increased by turning the screw further out of the housing 1 to consequently extend the elbow lever still more. Tolerances can be equalized by means of the pin 52 during assembly of the saw chain. With such an adjustment, however, the position of the guard 16 relative to the handle 11, i.e., the predetermined spacing $S_0$, is also changed.

Figure 15:
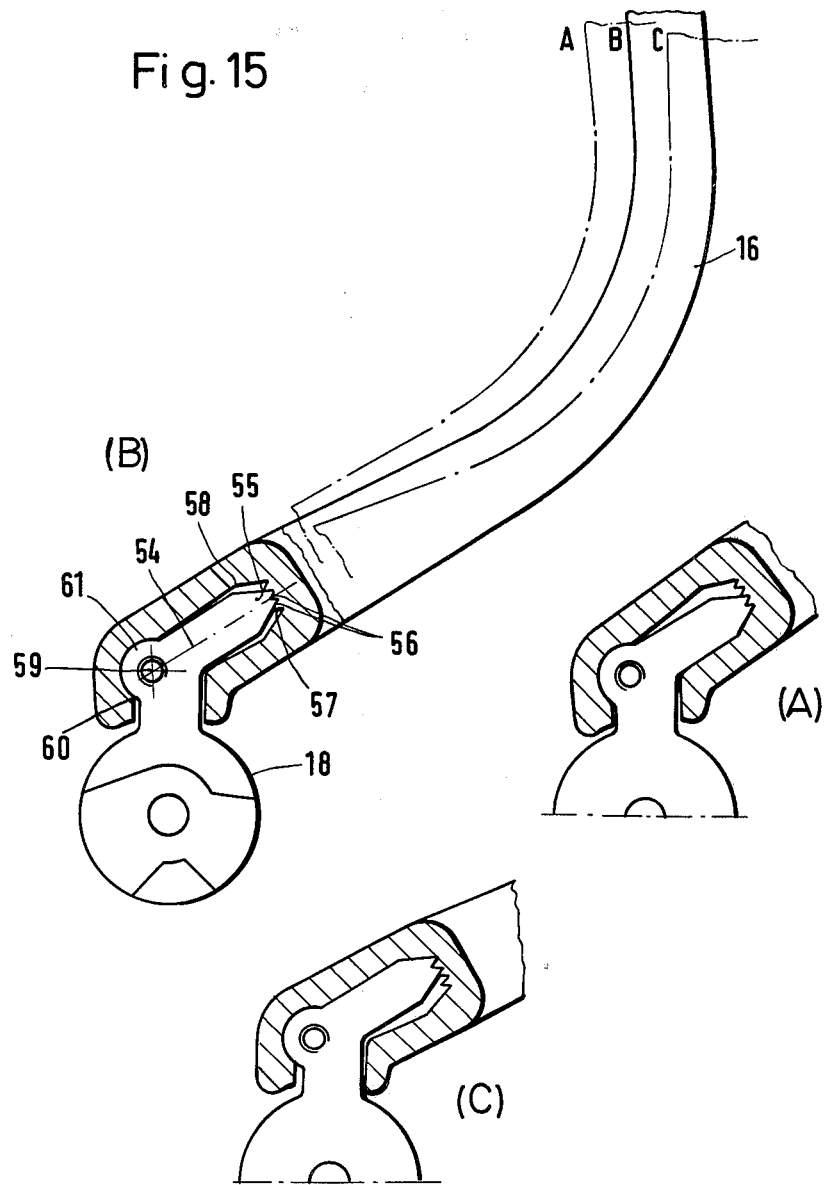
FIG. 15 is a partially sectioned view of a hand protective bracket or frame provided as a release mechanism, which is adjustable with respect to the bearing part thereof.

In order, after adjustment of the angle $\alpha$, to return the guard 16 to the prescribed predetermined position with respect to the handle 11, the guard 16 is adjustable relative to its bearing part 18, in particular, by means of an adjusting connection (FIG. 15). For this purpose, the bearing part 18 has a plug or insert 54 with a tapered end 55 which, with two teeth 56, engages a pertaining profiled portion 57 provided in the bottom of the recess 58 of the guard 16 for receiving the plug or insert 54. The shape of the profiled portion is selected in such a way that the guard 16 is capable of being arrested in the insert recess 58 in at least three different positions (dot-dash lines). So that the guard 16 can be swung or pivoted into a different arresting position relative to the bearing part, a screw 59 connecting both parts must be loosened, and the guard 16 must be withdrawn somewhat from the insert 54 in the insert direction thereof, so that the arresting connection can be released. The guard 16 is then pivoted upwardly or downwardly. For this purpose, the insert recess 58 and the insert 54 form a pivot linkage, which is formed by a recess 60 and a matching approximately spherical cup-like extension 61 of the insert 54. The axis of the screw 59 is located approximately in the middle point of the curvature of this extension 61.

Figure 12:
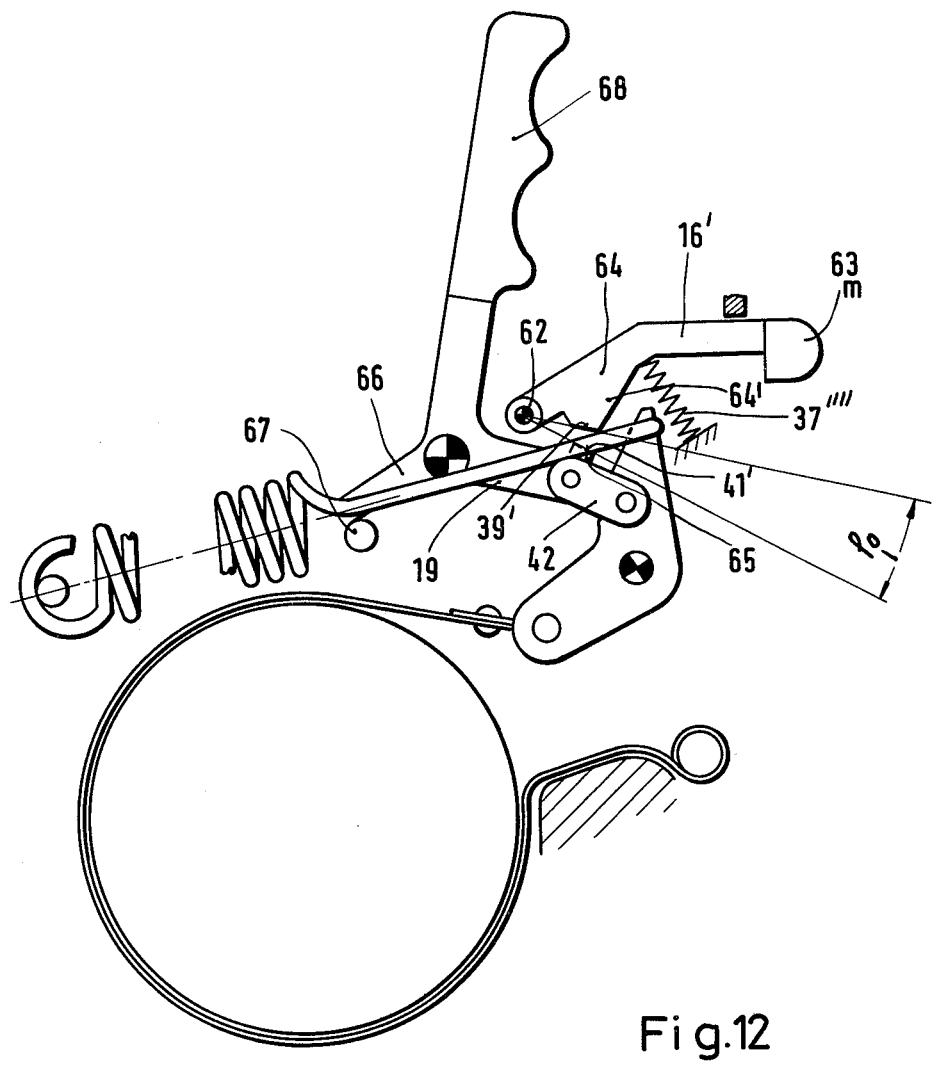

FIG. 12 shows a further embodiment of the inventive braking device, according to which the release, in addition to the finger protecting guard (not illustrated), is pivotally journalled at 62 on the housing between the guard and the saw chain.

The release 16' is embodied as an arm which extends at an obtuse angle and is widened at its free end 63 in the manner of a hammer. The release 16' is held in its ready position by the pressure spring 37'''', which extends between the housing and the free end of the release. The release 16', at that arm part 64 thereof which provides the link location 62, has a cam 64' with a planar abutment surface 39' which, in the release position, engages an abutment surface 41' of a cam 65 of the elbow lever 19, 42. These two surfaces have the angular spacing $p_0$ from each other, which corresponds to the acceleration path. The extension position of the elbow lever 19, 42 is limited upwardly by an abutment lever 66 connected with the bearing arm 19, and by a pertaining abutment pin 67 of the housing. In order to return the elbow lever 19, 42 from the braking position (not illustrated) to the extended position, there is provided a further handle 68 which extends approximately at right angles to the bearing arm 19 and is made integrally therewith. This design is particularly suitable for motor chain saws having a pivotal handle.

Figure 13:
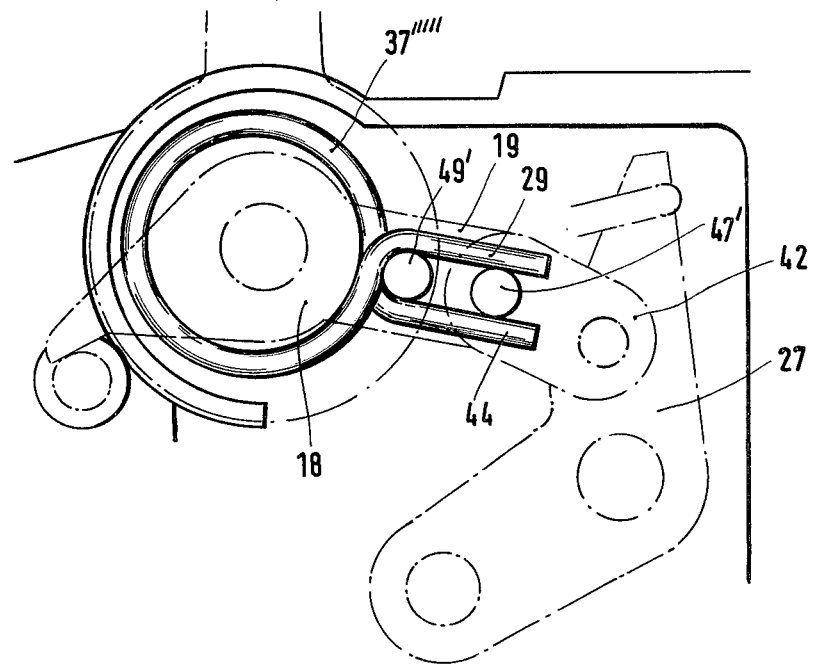
Figure 14:
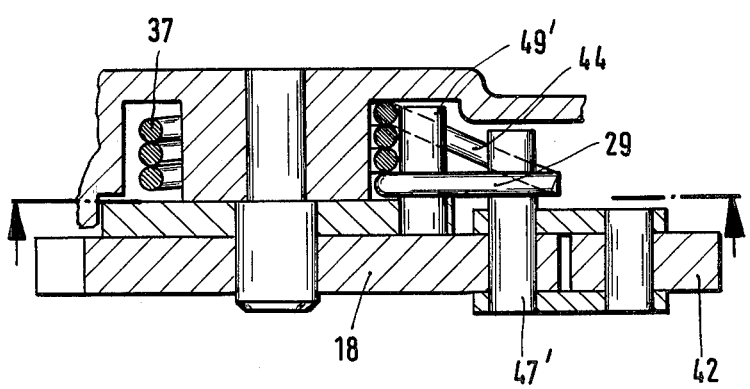
FIG. 14 shows the braking device of FIG. 13 along an axial section.

FIGS. 13 and 14 illustrate still another embodiment of the braking device, which differs from that of FIG. 9 only in that the legs 29 and 44 confine two successive pins 47' and 49' therebetween; these pins are arranged on the locking arm 19 or on the connecting arm 42 of the locking mechanism.

The present invention is, of course, in no way restricted to the specific disclosure of the specification and drawings, but also encompasses any modifications within the scope of the appended claims.

What we claim is:

1. A portable motor chain saw, comprising in combination:
    a housing;
    a braking device, arranged and associated with said housing, for stopping the saw chain during recoil;
    a locking mechanism arranged and associated with said braking device; and
    a release for said braking device arranged and associated with said housing, at least one holding means for holding said release in its ready position, said release being raised in brake-off position so as to have a spacing from said locking mechanism though able to move along a predetermined acceleration path toward the saw chain in the event of recoil and operatively engageable with said locking mechanism in the release position of said release, said release being an inertial mass which is freely movable along an acceleration path and which is so strongly accelerated during recoil of the motor chain saw that stored kinetic energy of said inertial mass in the release position is greater than the resistance force of said locking mechanism so that such kinetic energy is sufficient to disengage said locking mechanism automatically to overcome the resistance force without delay to assure especially high certainty during release of said braking device without manual actuation thereof being required and independently of angle of incidence of any force encountered therewith.

2. A chain saw in combination according to claim 1, in which said release, in its ready position with the spacing from the locking mechanism, has an angular spacing, from said locking mechanism, corresponding to said acceleration path and amounting to at least 1½°.

3. A portable motor chain saw comprising in combination:
a housing;
a braking device, arranged and associated with said housing, for stopping the saw chain during recoil;
a locking mechanism arranged and associated with said braking device;
a release for said braking device arranged and associated with said housing, said release being operatively engageable with said locking mechanism in the release position of said release, said release being an inertial mass which is freely movable along an acceleration path and which is so strongly accelerated during recoil of the motor chain saw that stored kinetic energy of said inertial mass in the release position is greater than the resistance force of said locking mechanism so that such kinetic energy is sufficient to disengage said locking mechanism automatically to overcome the resistance force without delay to assure especially high certainty during release of said braking device without manual actuation thereof being required and independently of angle of incidence of any force encountered therewith, said release, in its ready position, having an angular spacing, from said locking mechanism, corresponding to said acceleration path and amounting to at least 1½°, and at least one holding means for holding said release in its ready position.

4. A chain saw in combination according to claim 3, in which said release, in its ready position, has rotary play toward both sides relative to said locking mechanism.

5. A chain saw in combination according to claim 4, in which said release comprises a finger guard and a bearing part connected thereto and engageable with said locking mechanism, in which said braking device includes an angular lever, and in which said locking mechanism includes a locking arm, said locking arm and said angular lever being operatively connectable.

6. A chain saw according to claim 5, in which said holding means is a spring clip, a first end portion of which projects into a bore in said bearing part, and the other second end portion of which projects into a bore of said locking arm.

7. A chain saw according to claim 5, in which said holding means is a spring clip, and which includes a first abutment on said housing, and a secon abutment on said bearing part the end portions of said spring clip extending approximately in a hairpin configuration, with the free ends thereof, in the ready position of said release, engaging one of said abutments, and in a not ready position, including the braking position, against the other of said abutments, at least one of said end portions being bent to form said hairpin configuration, said second abutment being located between said at least one bent portion and said first abutment.

8. A chain saw according to claim 5, which includes a spring and in which said angular lever includes two arms, the narrow side of that arm of said angular lever which faces said bearing part of said finger guard and is connected with said spring and is operatively connectable with said locking arm is provided with a recess for receiving said locking arm.

9. A chain saw according to claim 8, in which that end of said locking arm connectable with said angular lever is provided with a roller which is engageable in said recess.

10. A chain saw according to claim 9, in which the outer diameter of said roller is at least twice as great as the radius of said recess.

11. A chain saw according to claim 5, which includes a bushing arranged on said bearing part, and in which said holding means is a spring clip, a first end portion of which is arranged in a transverse bore of said bushing, and the other second end portion of which is arranged in a bore of said locking arm, and which includes an adjustment member associated with said bushing.

12. A chain saw according to claim 11, in which said adjustment member is a threaded pin.

13. A chain saw according to claim 5, in which said release is located between said finger guard and said saw chain, and cooperates with said locking mechanism in the form of an elbow linkage having a locking arm and a handle integral therewith, said elbow linkage, in an extruded position, being limited by abutments, and adjustment member being associated with said elbow linkage.

14. A portable motor chain saw, comprising:
a housing;
a braking device, associated with said housing, for stopping the saw chain during recoil;
a locking mechanism associated with said braking device; and
a release for said braking device associated with said housing, said release being operatively engageable with said locking mechanism in the release position of said release, said release being an inertial mass which is freely movable along an acceleration path, the kinetic energy of said inertial mass in the release position being greater than the resistance force of said locking mechanism, said release, in its ready position, having an angular spacing, from said locking mechanism, corresponding to said acceleration path and amounting to at least 1½°, at least one holding means for holding said rlease in its ready position, said release, in its ready position, having rotary play toward both sides relative to said locking mechanism, said release comprising a finger guard and a bearing part connected thereto and engageable with said locking mechanism, said braking device including an angular lever, and said locking mechanism including a locking arm, said locking arm and said angular lever being operatively connectable, a connecting arm pivotally connected with said locking arm and said angular lever, said locking arm and said connecting arm forming an elbow linkage, and a spring for holding said linkage in a stable locking position, in which position said locking arm and said connecting arm form an angle of approximately 180°.

15. A chain saw according to claim 14, in which said angle is between 160° and 179°.

16. A chain saw according to claim 14, in which said angular spacing is approximately 4°.

17. A chain saw according to claim 14, in which said holding means is a spring which extends between said housing and said release.

18. A chain saw according to claim 14, in which said release, in the form of said finger guard, is adjustable relative to said bearing part.

19. A chain saw according to claim 18, in which, for effecting said adjustment, said bearing part includes an insert having a tapered end, and said finger guard is provided with an insert recess, the bottom of which is provided with a toothed portion for receiving said tapered end of said insert.

* * * * *